United States Patent
Larsen et al.

(10) Patent No.: US 12,385,574 B2
(45) Date of Patent: Aug. 12, 2025

(54) ELECTRIC EXPANSION VALVE

(71) Applicant: Danfoss A/S, Nordborg (DK)

(72) Inventors: Sigurd Larsen, Kruså (DK); Kurt Harck, Sønderborg (DK); Søren Støttrup Kristensen, Horsens (DK); Birthe Nissen Reese, Nordborg (DK); Charlotte Vibeke Pingel Vagnsholdt, Augustenborg (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 18/733,940

(22) Filed: Jun. 5, 2024

(65) Prior Publication Data
US 2024/0318743 A1    Sep. 26, 2024

Related U.S. Application Data

(63) Continuation of application No. 17/415,510, filed as application No. PCT/EP2019/085364 on Dec. 16, 2019, now Pat. No. 12,072,039.

(30) Foreign Application Priority Data

Dec. 20, 2018 (EP) .................................... 18214593

(51) Int. Cl.
*F16K 31/50* (2006.01)
*F25B 41/35* (2021.01)

(52) U.S. Cl.
CPC ............ *F16K 31/508* (2013.01); *F25B 41/35* (2021.01); *F25B 2500/01* (2013.01)

(58) Field of Classification Search
CPC ......................... F25B 41/35; F25B 2500/001
See application file for complete search history.

(56) References Cited

U.S. PATENT DOCUMENTS

| 2016/0369911 A1* | 12/2016 | Arai ....................... F16K 31/047 |
| 2019/0368792 A1* | 12/2019 | Tang ......................... F16K 1/50 |
| 2020/0386340 A1* | 12/2020 | Lv ............................ F16H 57/02 |

* cited by examiner

*Primary Examiner* — Elizabeth J Martin
(74) *Attorney, Agent, or Firm* — McCormick, Paulding & Huber PLLC

(57) ABSTRACT

An electric expansion valve (1) including a valve housing (12), a valve seat (2), a valve element (3) cooperating with the valve seat (2), a drive driving the valve element (3) and including a rotary motor (4) having an axis (17) of rotation. The valve element (3) is connected to the motor (4) and has a possibility of radial displacement between the rotor (6) and the valve element (3) with respect to the axis (17) of rotation. Such an expansion valve should ensure a long lifetime with low production costs. To this end the valve element (3) is connected to the motor (4) by means of a fixing element (16) which guarantees a defined position of the valve element (3) in axial direction while allowing the radial displacement between the axis (17) of rotation and the valve element (3).

20 Claims, 1 Drawing Sheet

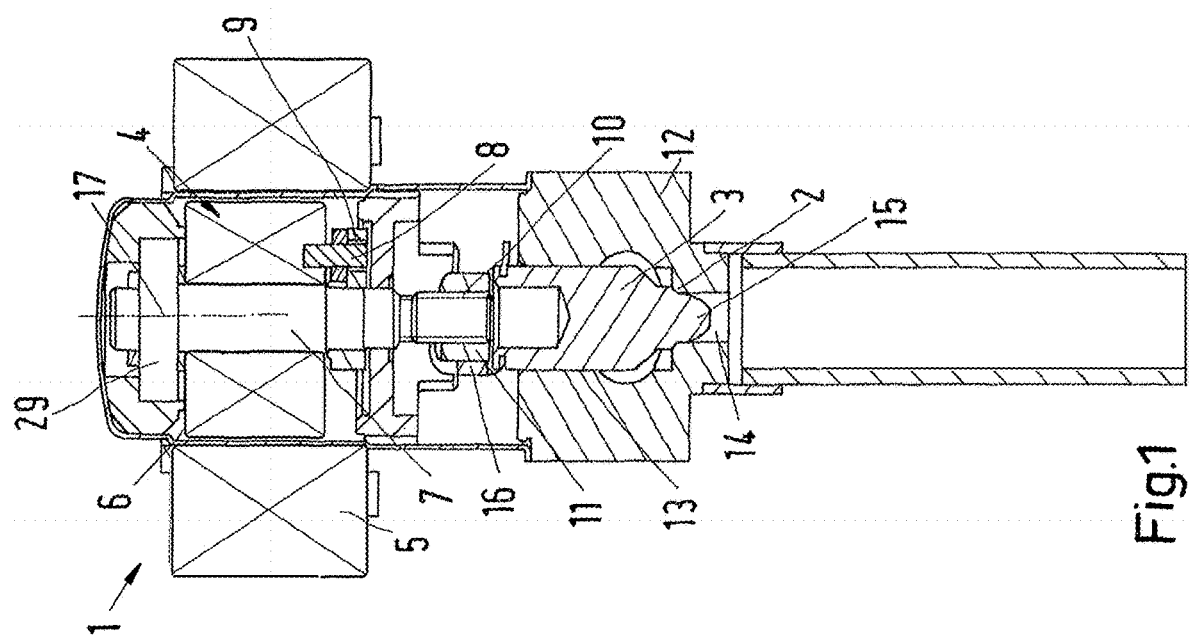
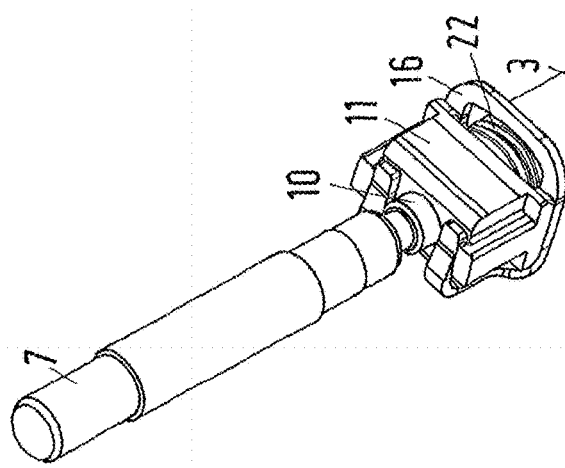
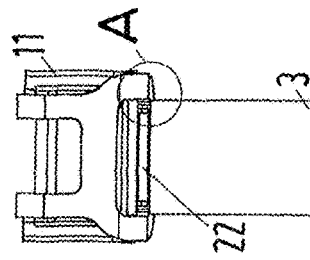
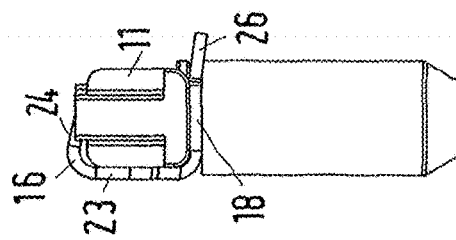
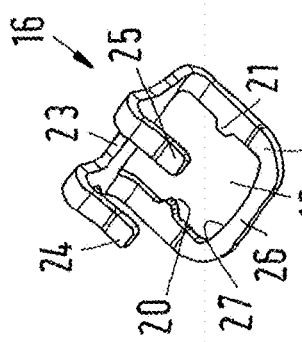
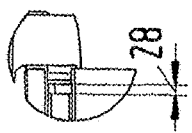

ELECTRIC EXPANSION VALVE

CROSS REFERENCE TO RELATED APPLICATIONS

This application is a continuation of U.S. patent application Ser. No. 17/415,510, filed Jun. 17, 2021, which is a National Stage application of International Patent Application No. PCT/EP2019/085364, filed on Dec. 16, 2019, which claims priority to European Application No. 18214593.8, filed on Dec. 20, 2018, each of which is hereby incorporated by reference in its entirety.

TECHNICAL FIELD

The present invention relates to an electric expansion valve comprising a valve housing, a valve seat, a valve element cooperating with the valve seat, a drive driving the valve element and comprising a rotary motor having an axis of rotation, wherein the valve element is connected to the motor having a possibility of a radial displacement between the rotor and the valve element with respect to the axis of rotation.

BACKGROUND

Such an expansion valve is known, for example, from EP 3 109 526 A1.

Such a valve can be used, for example, to control a flow of a refrigerant through a cooling or refrigeration system. When the rotary motor is operated, the valve element is moved towards or away from the valve seat. In order to interrupt the flow of the refrigerant through the expansion valve it is necessary, that a valve element fully contacts the valve seat, i.e. there must not be a gap between the valve element and the valve seat. This requires a rather exact guidance of the valve element with respect to the valve seat.

The valve element has to be connected to the motor and the motor has to be positioned with respect to the housing. In order to achieve the above-mentioned condition, it is necessary to position the motor with a very high accuracy with respect to the valve housing. This makes manufacturing of such a valve expensive. If the motor is positioned with less accuracy, the production costs can be lowered. However, the consequence of this is that the expansion valve has reduced lifetime, since there is an important wear of the moving parts of the valve element.

SUMMARY

The object underlying the invention is to ensure a long lifetime with low production costs.

This object is solved with an electric expansion valve as described in the outset in that the valve element is connected to the motor by means of a fixing element (16) which guarantees a defined position of the valve element (3) in axial direction while allowing a radial displacement between the axis (17) of rotation and the valve element (3).

Such a construction does not require a very high accuracy when positioning the motor with respect to the housing. A small offset between the axis of rotation and the moving axis of the valve element is allowed, since the connection between the valve element and the motor allows a radial movement or displacement of the rotor relative to the valve element and vice versa. The fixing element can guarantee a defined position of the valve element in axial direction while allowing a radial displacement between axis of rotation and a valve element. A small axial displacement may be possible, however such an axial displacement in less then factor 10 of a possible radial displacement. The fixing element can, for example, tension the valve element in a direction towards the motor.

In an embodiment of the invention the rotary motor comprises a rotor which is fixed in axial direction with respect to the housing, wherein a transmission is arranged between the rotor and the valve element translating a rotary movement of the rotor into a translational movement of the valve element. When the rotor of the motor is fixed in axial direction, the magnetic condition does not change in dependence of the axial position of the valve element. The torque, which can be produced by the cooperation of a stator and the rotor of the electric motor, can be kept constant over the whole working stroke of the valve element.

In an embodiment of the invention the rotor is supported by a bearing arranged on a side of the rotor opposite the valve element. The bearing does not conflict with other parts of the valve, in particular with the valve element and the transmission.

In an embodiment of the invention the transmission comprises a lead screw and a lead nut. When, for example, the rotor is connected to the lead screw and the lead nut is secured against rotation, a rotation of the rotor and a corresponding rotation of the lead screw leads to a translational movement of the lead nut.

In an embodiment of the invention the valve seat is part of the housing. Accordingly, it is not necessary to mount a separate part into the housing forming the valve seat.

In an embodiment of the invention the valve seat is rounded. In other words, the edge of a bore forming the valve seat has been machined to form a rounded edge. Such a construction facilitates a tight closure of the valve.

In an embodiment of the invention the housing comprises a guide section guiding the valve element. The guiding section and the valve seat are aligned with respect to each other. The valve seat and the guide section can be machined in a single production step making it easy to align the guide section and the valve seat. The internal diameter of the guide section is only slightly larger than the diameter of the valve element, for example by 0.1 mm. The length of the guide section should be larger than the internal diameter of the guide section.

In an embodiment of the invention the valve element and the housing are of different materials at least in the guide section. One possible pairing of materials is brass for the valve element and steel for the housing. These two materials can slide against each other without or with little wear as long as the material can slide with respect to each other with low friction. The different materials can include different metal alloys including different steel alloys.

In an embodiment of the invention the valve element is connected to the motor by means of the lead nut. The connection between the valve element and the lead nut allows for the radial displacement between the lead nut and the valve element.

In an embodiment of the invention the fixing element comprises a frame enclosing an area which is larger than the cross section of the fixing element, wherein the frame comprises at least a finger protruding into an elongated recess at the valve element. The frame forms at least partly a border limiting relative movement between the valve element and the driven part of the motor. It simplifies the mounting of the valve element. The fixing element can be mounted on the lead nut before the fixing element is connected to the valve element.

In an embodiment of the invention the frame comprises a section bent towards the rotor. The bent section forms a stop limiting a movement of the fixing element with respect to the valve element.

In an embodiment of the invention the fixing element is U-shaped in a side view, wherein a base of the U forms a stop. The base of the U is opposite to the section bent towards the rotor. The base and the bent section form two stops. They are preferably arranged in a line parallel to the direction of the finger, wherein it is preferred that a pair of opposing fingers is used.

In an embodiment of the invention the fixing element fixes a valve element to an element of the transmission which is fixed against rotation. This element can be, for example, the lead nut. This simplifies the assembly of the valve.

BRIEF DESCRIPTION OF THE DRAWINGS

A preferred embodiment of the invention will now be described in more detail with reference to the drawing, wherein:

FIG. 1 shows a sectional view through an expansion valve,

FIG. 2 shows a valve element of the expansion valve and a transmission,

FIG. 3 shows a fixing element connecting the valve element and the transmission, FIG. 4 shows a side view of the valve element connecting to a lead screw, FIG. 5 shows a front view of the valve element connected to the lead screw and FIG. 6 shows a detail A of FIG. 5.

DETAILED DESCRIPTION

FIG. 1 shows an expansion valve 1 in a sectional view. The expansion valve 1 comprises a valve seat 2 and a valve element 3. The valve element 3 can be moved towards and away from the valve seat 2. To this end the valve element 3 is driven by drive means comprising a rotary motor 4. The motor 4 comprises a stator 5 and a rotor 6. The rotor 6 is supported by a bearing 29 located on a side of the rotor 6 opposite the valve element 3. The motor 4 can be in form of a stepper motor.

The rotor 6 is operatively connected to a shaft 7. This can be achieved in that the rotor 6 is mounted rotatable on shaft 7 and drives the shaft 7 indirectly by means of a follower arrangement comprising a pin 8 which is connected to the rotor 6 and protrudes into a stop member 9 which is connected to the shaft 7. However, other connections are possible.

The shaft 7 comprises an outer thread forming a lead screw 10. The lead screw 10 is threadedly connected to a lead nut 11. The lead nut 11 is rotatably fixed with respect to a housing 12. When the shaft 7 rotates in one direction, the lead nut 11 is translated in one direction and when the shaft 7 rotates in the opposite direction the lead nut 11 is translated into the other direction.

The valve element 3 is connected to the lead nut 11 so that a movement of the lead nut 11 is directly transferred to the valve element 3.

The housing 12 comprises a guiding section 13 guiding the valve element 3. The valve element 3 and the housing 12 are made of different materials, in particular different metal materials. The housing 12 can be, for example, made of steel and the valve element 3 can be, for example, of brass. The pairing of brass and steel allows a sliding of the valve element 3 in the guiding section 13 with low friction and accordingly of low wear. Other pairings of materials can be used, for example, different metal alloys including different steel alloys.

The diameter 17 of the valve element is preferably larger than the diameter of the guiding section 13. When the diameter of the valve element 3 is d1 and the diameter of the guiding section 13 is d2, then the following relation is fulfilled: d1>d2>d1+0.1 mm. The connection between the valve element 3 and the rotor 6 of the motor 4 allows a displacement of, for example 0.2 mm. Together this allows for a radial displacement of the valve element relative to the rotor of +−0.2 mm.

The valve seat 2 is part of the housing 12. It is aligned with the guiding section 13 which can easily be achieved by producing the valve seat 2 and the guiding section 13 in the same production step, for example with the same drill.

The valve seat 2 is rounded. It forms a round edge of a bore 14 into which a protrusion 15 of the valve element can enter when the valve 1 is closed.

The valve element 3 is connected to the lead nut 11 by means of a fixing element 16 fixing the valve element 3 to the lead nut 11 in axial direction, but allowing a radial displacement of the shaft 7 and the lead nut 11 in radial direction relative to the valve element 3, wherein the radial direction refers to an axis 17 of rotation of the shaft 7. The fixing element 16 can be, for example, in form of a spring element, wherein the fixing element 16 clamps the valve element 3 against the lead nut 11.

The assembly of valve element 3, shaft 7, lead screw 10, lead nut 11 and fixing element 16 is shown in FIG. 2. The lead screw 10 is threaded into the lead nut 11. The lead nut 11 is of rectangular cross section to secure it against a rotation relative to the housing 12.

The fixing element 16 is shown in more details in FIG. 3. The fixing element 16 comprises a frame 18 around an open area 19. Area 19 is larger than the cross section of the valve element 3. Frame 18 comprises two fingers 20, 21 protruding into the open area 19. When the fixing element 16 is mounted to the valve element 3 the fingers 20, 21 protrude into an elongated recess 22 in the valve element 3. A simple form of the recess 22 is a groove running in circumferential direction so that an angular orientation of the valve element 3 with respect to the fixing element 16 is of no importance when assembling these parts.

In a side view shown in FIG. 4 the fixing element 16 is of U-form having a base 23 which rests against the lead nut 11 or forms at least a stop against which the lead nut 11 comes to rest.

Furthermore, the fixing element 16 comprises a pair of fixing fingers 24, 25 which are connected to the frame 18 by means of the base 23. The fixing fingers 24, 25 together with the frame 18 and the fingers 20, 21 produce a force acting on the valve element 3 in a direction towards the motor 4, i.e. the fixing element 16 pulls the valve element 3 against the lead nut 11 in axial direction (related to the axis 17 of rotation).

The frame 18 comprises an angled section 26 which is bent towards the rotor 6 and thus towards the lead nut 11. An inner border 27 of the angled section 26 forms a stop limiting a movement of the fixing element 16 with respect to the valve element 3 in a direction perpendicular to the angled section.

As can be seen in FIG. 6 there is no or only a limited axial play between the valve element 3 and the lead nut 11.

However, there is a radial play allowing a radial displacement 28 between the valve element 3 and the lead nut 11.

In other words, even when the axis 17 of rotation is not exactly aligned with the centre of the guiding section 13 there are basically no lateral forces on the valve element 3 pressing the valve element 3 into the guiding surface of the guiding section 13. The fixing element 16 allows a small radial displacement between the lead nut 11 and the valve element 3.

The use of a transmission comprising a lead screw 10 and a lead nut 11 allows to keep the rotor 6 of the motor 4 stationary within the stator 5, i.e. independently of the position of the valve element 3 the magnetic forces acting between the stator 5 and the rotor 6 are always the same. In other words, the rotor 6 is only rotating and not translating.

The only moving parts touching each other are the valve element 3 and the housing 12 and this contact can be limited to the guiding section 13.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An electric expansion valve comprising a valve housing, a valve seat, a valve element cooperating with the valve seat, a drive driving the valve element and comprising a rotary motor having an axis of rotation, wherein the valve element is connected to the motor such that a radial displacement is allowed between a rotor of the rotary motor and the valve element with respect to the axis of rotation, wherein the valve element is connected to the motor by means of a fixing element, positioning the valve element in a defined position in an axial direction while allowing the radial displacement between the axis of rotation and the valve element.

2. The expansion valve according to claim 1, wherein the rotor is fixed in axial direction with respect to the housing, wherein a transmission is arranged between the rotor and the valve element translating a rotary movement of the rotor into a translational movement of the valve element.

3. The expansion valve according to claim 2, wherein the rotor is supported by a bearing arranged on a side of the rotor opposite the valve element.

4. The expansion valve according to claim 2, wherein the transmission comprises a lead screw and a lead nut.

5. The expansion valve according to claim 2, wherein the valve seat is part of the housing.

6. The expansion valve according to claim 2, wherein the valve seat is rounded.

7. The expansion valve according to claim 3, wherein the transmission comprises a lead screw and a lead nut.

8. The expansion valve according to claim 3, wherein the valve seat is part of the housing.

9. The expansion valve according to claim 1, wherein the valve seat is part of the housing.

10. The expansion valve according to claim 1, wherein the valve seat is rounded.

11. The expansion valve according to claim 1, wherein the housing comprises a guide section guiding the valve element.

12. The expansion valve according to claim 11, wherein the valve element and the housing are of different materials at least in the guide section.

13. The expansion valve according to claim 1, wherein the valve element is connected to the motor by means of the lead nut.

14. The expansion valve according to claim 1, wherein the fixing element comprises a frame enclosing an area which is larger than the cross section of the valve element, wherein the frame comprises at least a finger protruding into an elongated recess at the valve element, and wherein the frame comprises a section bent towards the rotor.

15. The expansion valve according to claim 1, wherein the fixing element fixes the valve element to an element of the transmission which is fixed against rotation.

16. The expansion valve according to claim 1, wherein the fixing element clamps the valve element to a lead nut connected to a shaft that is operatively connected to the rotor.

17. The expansion valve according to claim 16, wherein the lead nut is arranged to translate in the axial direction when the shaft rotates.

18. The expansion valve according to claim 16, wherein the fixing element allows no axial play between the valve element and the lead nut.

19. The expansion valve according to claim 16, wherein the fixing element allows for little axial play between the valve element and the lead nut such that axial displacement of the valve element is less than a factor of 10 of the allowed radial displacement of the valve element.

20. The expansion valve according to claim 1, wherein the fixing element tensions the valve element in a direction towards the rotary motor.

* * * * *